UNITED STATES PATENT OFFICE.

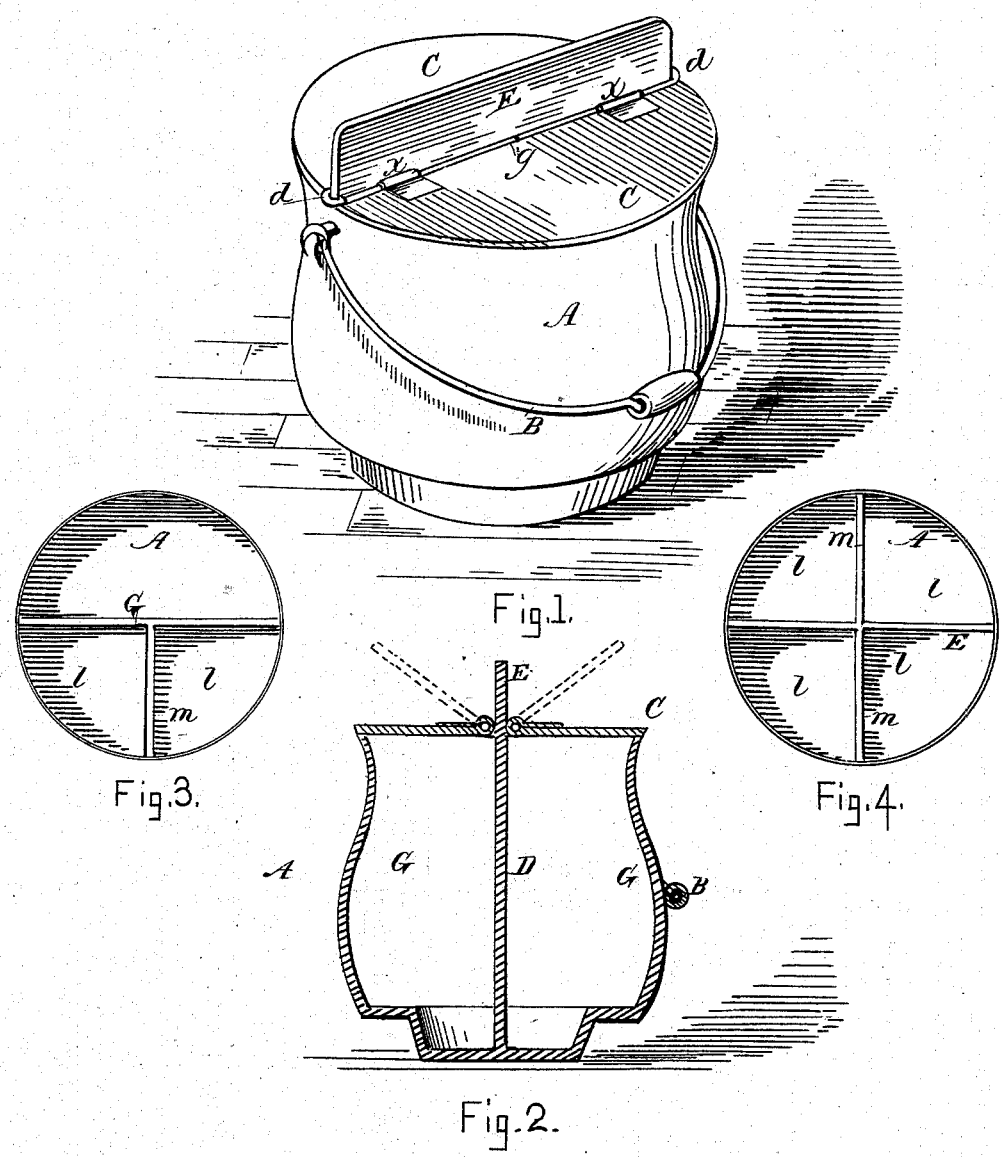

DAVID SNYDER, OF GRAFTON, MASSACHUSETTS, ASSIGNOR OF ONE-THIRD TO ALBERT L. FISHER, OF SAME PLACE.

POT AND KETTLE.

SPECIFICATION forming part of Letters Patent No. 274,147, dated March 20, 1883.

Application filed December 11, 1882. (No model.)

*To all whom it may concern:*

Be it known that I, DAVID SNYDER, of Grafton, in the county of Worcester, State of Massachusetts, have invented a certain new and useful Improvement in Pots and Kettles, of which the following is a description sufficiently full, clear, and exact to enable any person skilled in the art or science to which said invention appertains to make and use the same, reference being had to the accompanying drawings, forming a part of this specification, in which—

Figure 1 is an isometrical perspective view; Fig. 2, a vertical transverse section, and Figs. 3 and 4 plan views showing modifications of my improved pot or kettle.

Like letters of reference indicate corresponding parts in the different figures of the drawings.

My invention relates to that class of pots and kettles which are employed for culinary purposes on stoves, ranges, &c.; and it consists in a novel construction and arrangement of the parts, as hereinafter more fully set forth and claimed, by which a more desirable article of this character is produced than is now in ordinary use.

In cooking vegetables and other articles of food in pots and kettles of ordinary construction, or having but one compartment, the flavor is greatly injured, and sometimes entirely spoiled, where more than one article is cooked at a time in the same vessel. For instance, in boiling onions and turnips, if cooked together, the flavor of the onions will be imparted to the turnips, and vice versa, thereby seriously impairing their value as articles of food.

One of the objects of my improvement is to overcome this difficulty or objection; and to that end I construct the pot or kettle with a vertical partition through its center, dividing it into compartments G G, as best seen in Fig. 2, whereby the contents may be separated in such a manner as to prevent the different articles from imparting their flavor to each other during the process of cooking.

The nature and operation of the improvement will be readily understood by all conversant with such matters from the following explanation, its extreme simplicity rendering an elaborate description unnecessary.

In the drawings, A represents the body of the pot or kettle; B, the bail; C, the covers, and D the partition. The partition extends or rises above the body, as shown at E in Fig. 1, and is preferably cast integral therewith, the object of the extension E being to prevent the fumes or steam in one compartment from passing into the other, and also to afford a cheap and ready means of attaching the covers C C. Two covers are provided, one for each compartment, as seen in Fig. 1, and are hinged at $x$ $x$ to the wire $d$. This wire is not permanently attached to the vessel, and passes entirely around the part E, its ends coming together at the center, as shown at $g$, thereby enabling the covers to be readily attached or detached at pleasure.

A modification of my improvement is shown in Fig. 4, which represents a pot or kettle having four compartments, $l$ $l$ $l$ $l$, the compartments shown in Fig. 2 being divided by transverse partitions $m$ $m$, which rise to the top of the body A, but not above it, thereby enabling each of the covers C to serve for two of the compartments $l$ $l$.

I sometimes make use of but one of the partitions $m$, as shown in Fig. 3, thus producing a kettle having one large and two small compartments, which are covered in the same manner heretofore described.

It will also be obvious that one or both of the compartments G may be divided into three or more smaller compartments in the same manner, if desired, without departing from the spirit of my invention.

Having thus explained my improvement, what I claim is—

1. A pot or kettle having a central partition formed integral therewith, and extending above the top of the kettle, and provided with removable covers hinged to a wire which passes over and around the central partition, substantially as set forth.

2. The covers C C, hinged to the wire $d$, and adapted to be attached to the pot or kettle, substantially as specified.

DAVID SNYDER.

Witnesses:
DAVID MANNING, Jr.,
A. L. FISHER.